Dec. 19, 1961    H. M. THOMPSON    3,013,677
HAYSTACK MOVING APPARATUS
Filed Aug. 7, 1958    2 Sheets-Sheet 2

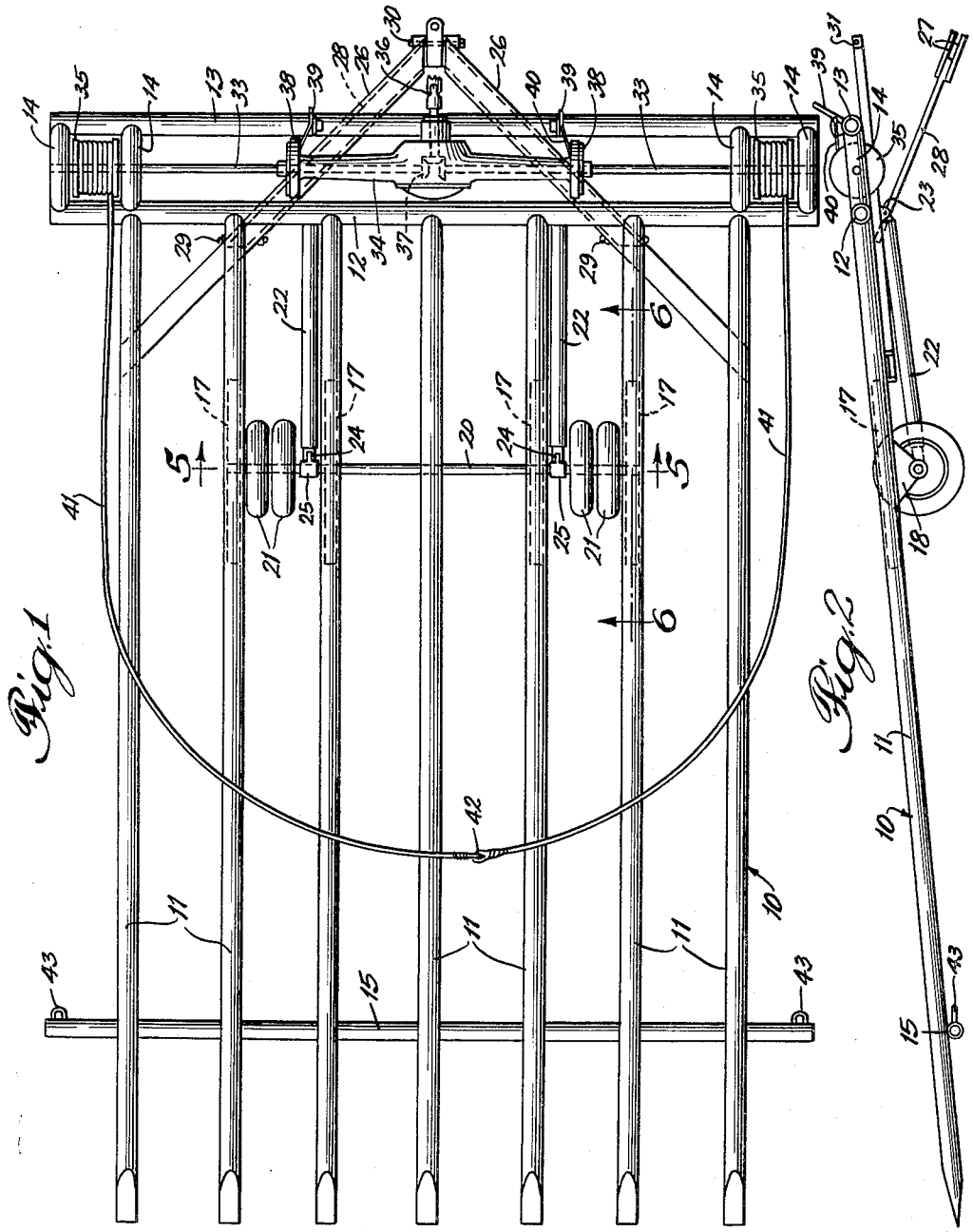

INVENTOR:
Henry M. Thompson,
BY Dawson, Tilton, Fallon & Lungmus,
ATTORNEYS.

United States Patent Office 3,013,677
Patented Dec. 19, 1961

3,013,677
HAYSTACK MOVING APPARATUS
Henry M. Thompson, Cottonwood, S. Dak.
Filed Aug. 7, 1958, Ser. No. 753,712
3 Claims. (Cl. 214—85.1)

This invention relates to a haystack moving apparatus, and more specifically, to a trailer adapted to receive and support for movement stacks of hay and the like.

One of the principal objects of the present invention is to provide an improved trailer structure which is extremely sturdy and durable and which may be easily operated for receiving, transporting, and releasing a haystack. Another object is to provide a trippable trailer equipped with means for pulling or pushing a haystack onto or off of the supporting surface thereof. In this connection, it is a specific object to provide means for guiding and directing a haystack as it is drawn upwardly and forwardly upon the trailer or urged downwardly and rearwardly therefrom. Another object is to provide a trailer having a longitudinally movable wheel assembly in which the mounting means for that assembly is concealed and protected within the longitudinal members of the trailer frame, thereby avoiding clogging and obstruction of the moving parts. A still further object is to provide a trailer for moving haystacks which is of extremely sturdy construction and which is provided with a frame having smooth rounded members for minimizing the frictional resistance between the trailer and a load carried thereby.

Other objects will appear from the specification and drawings in which:

FIGURE 1 is a top plan view of a trailer embodying the present invention;

FIGURE 2 is a side elevation of the trailer in a condition similar to that shown in FIGURE 1 but with the front connecting linkage in released or lowered condition;

Figure 3:
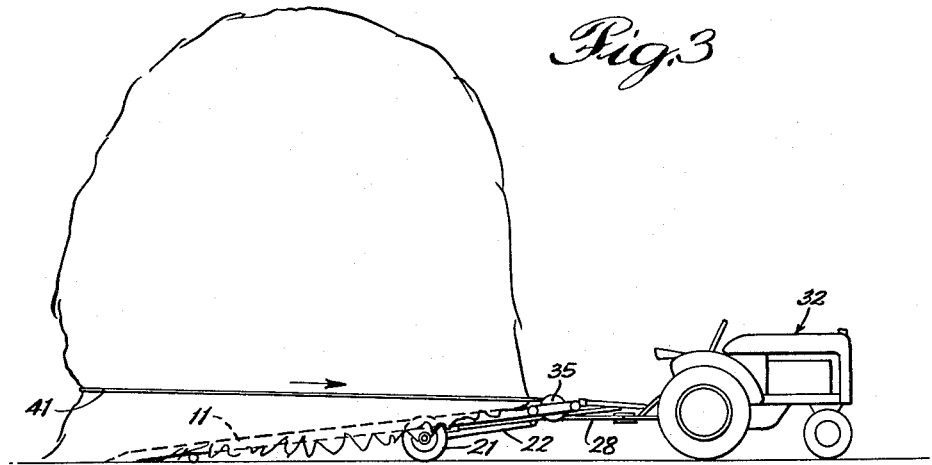
FIGURE 3 is a side elevation of the trailer as it appears immediately after receiving a load of hay thereon, the trailer being shown in operative relation with a conventional tractor.

In the trailer construction illustrated in the drawings, the numeral 10 generally designates a trailer frame having a plurality of spaced tubular members 11 extending longitudinally of the trailer and lying along the same generally horizontal plane. At their front ends, the longitudinally extending members 11 are welded or otherwise secured to a transversely extending tubular member 12 which is in turn connected to a front transverse member 13 by a plurality of relatively short longitudinal connecting members 14. The rear ends of the hollow tubular frame members 11 are flattened or tapered and, as shown most clearly in FIGURES 1 and 2, a transversely extending tube 15 is secured to the undersurfaces of members 11 adjacent the rear ends thereof for maintaining those members in substantially uniformly spaced relation.

Figure 5:
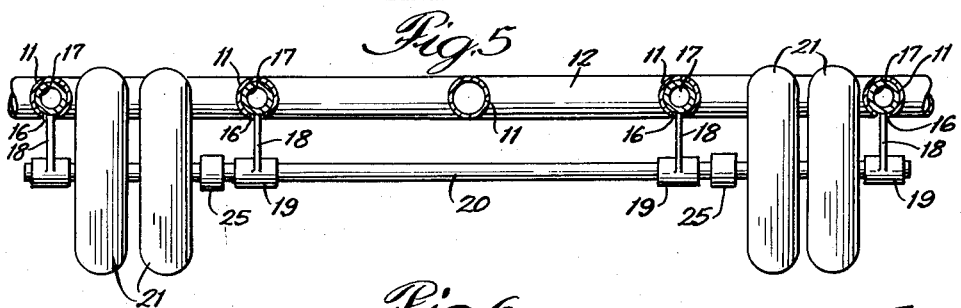
FIGURE 5 is an enlarged vertical cross section taken along line 5—5 of FIGURE 1.

The longitudinally extending tubes 11 provide smooth outer surfaces and, as shown in FIGURE 5, are of generally circular cross section. The intermediate portions of adjacent pairs of tubular members 11 along opposite sides of the central tubular member are provided with longitudinally extending bottom slots 16. Relatively short inner tubular members 17 are slidably carried within tubes 11 and are secured to triangular mounting plates 18 which project downwardly and outwardly through the slots. The lower ends of the mounting plates are fixed to journal on bearing members 19 which rotatably receive the transversely extending axle 20 of the trailer's undercarriage.

While generally triangular connecting plates 18 have been shown in the drawings, it will be understood that springs or other suitable cushioning means may be interposed between inner tubes 17 and bearings 19 to absorb the shocks and vibrations which occur in traversing uneven ground. Similarly, the two pairs of wheels 21 may be, if desired, rotatably mounted upon shaft 20 with the shaft rigidly secured to depending plates 18, rather than providing a rotatable mounting for the axle or shaft.

Figure 4:
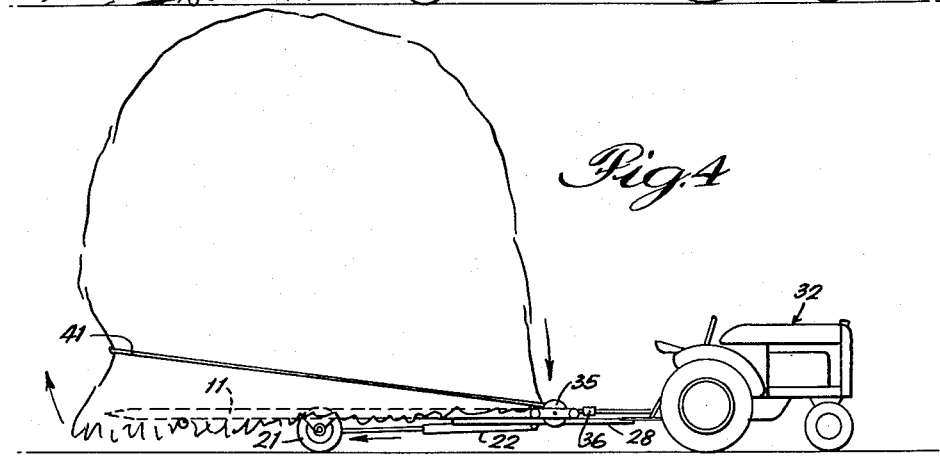
FIGURE 4 is a side elevation similar to FIGURE 3 but showing the trailer with the wheel assembly thereof shifted rearwardly.
Figure 6:
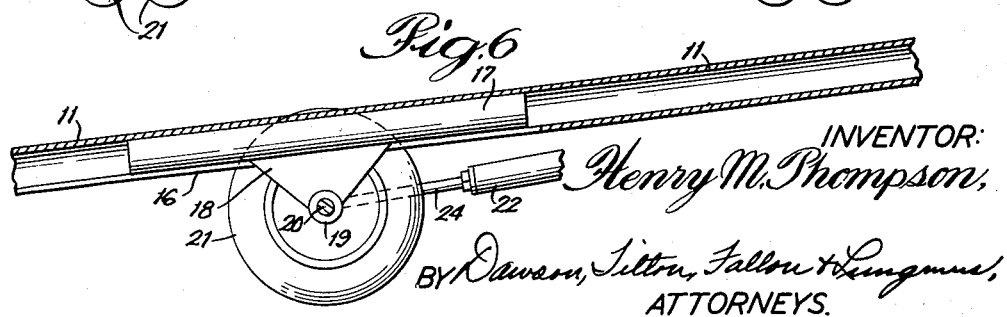
FIGURE 6 is an enlarged vertical longitudinal section taken along line 6—6 of FIGURE 1.

The trailer undercarriage is shifted longitudinally beneath the frame or rack 10 by a pair of double-acting hydraulic cylinders 22. As shown most clearly in FIGURES 1, 2 and 6, each cylinder is pivotally connected adjacent the front end thereof to a lug 23 secured to front transverse member 12. The cylinder is equipped with a reciprocable piston 24 having at its rear end a pivotal connector 25 which rotatably receives axle 20. Therefore, when pressure fluid flows into the front ends of the hydraulic cylinders, the pistons 25 are driven rearwardly and urge the undercarriage into a first position (FIGURE 4) in which the trailer is substantially balanced upon wheels 21. The frame or rack 10 will then be in a generally horizontal load-carrying position. However, when the flow of pressure fluid drives the pistons forwardly the undercarriage slides into its forward or second position, thereby tipping or rocking the frame rearwardly and downwardly (FIGURES 2 and 3). In its tipped position, the frame may be readily loaded or unloaded, as will be hereinafter described.

Extending forwardly and inwardly along the underside of the frame or rack 10 are a pair of inverted channel members 26. These converging members project forwardly beyond the front transverse member 13 and are spaced apart at their front ends to receive therebetween the spaced coupling plates 27 of the V-shaped yoke or drawbar 28. As shown most clearly in FIGURE 1, the rear ends of the diverging members of drawbar 28 are pivotally secured to the inverted channel members 26 by transversely extending hinge pins 29. The members of the drawbar are narrower than the grooves of members 26 so that when the bar 28 is in raised position the members of that bar will nest within the inverted channel members. A removable pin or bolt 30 extending through openings 31 at the front ends of the channel members and between the coupling plates 27 of the yoke securely holds the parts in nested relation (FIGURE 1) when the drawbar is fully raised. However, when the pin is removed, the drawbar is free to swing downwardly about its hinged rear ends, or, if the drawbar is held in place, then the frame 10 is free to rock or tip rearwardly (FIGURE 2). Thus, the rack or frame 10 may be pivoted between its tilted load-receiving or load-discharging position (FIGURE 3) and its horizontal load-carrying position (FIGURE 4) without uncoupling the tractor 32 or other driving means.

Referring now to FIGURES 1 and 2, it will be seen that the pairs of longitudinal frame members 14 at the outer ends of spaced members 12 and 13 are apertured for rotatably receiving transverse shafts 33. The inner end portions of these axially-aligned shafts are carried within a differential housing 34 centrally disposed between members 12 and 13 while the outer end portions of those shafts are provided with reels or drums 35. A universal-providing drive shaft 36 extends between a suitable power take-off of a tractor and the differential housing 34 and transmits power to the reel-carrying shafts 33 through the differential gear assembly 37. Since such differential gear arrangements are well known in the art, a detailed description of their structure and operation is believed unnecessary herein.

At the outer ends of the transversely elongated housing 34 are a pair of friction brake assemblies 38 connected to pivotally mounted actuating levers 39 by cables 40. Thus, either of the brakes may be actuated to reduce the rotational speed of the shaft passing therethrough and, since the shafts are connected to the differential 37, a decrease in the rotational speed of one of the shafts 33 will result in a corresponding increase in the speed of the other shaft.

Each of the reels or drums 35 carries a length of cable or rope 41 wound, or adapted to be wound, thereon. The free ends of the cables 41 are detachably connected by a hook and eye arrangement 42 or by any other suitable means. Therefore, depending upon the direction of rotation of drive shaft 36, the loop of cable will be either wound upon or unwound from the drums when the apparatus is in operation.

When it is desired to move a haystack or the like with the structure of the present invention, the apparatus is connected to a conventional tractor by attaching the apertured forward end of the V-shaped yoke 28 to the tractor chassis and by connecting drive shaft 36 to the tractor's power takeoff shaft. The trailer is then backed up to a stack which is to be moved, and the means 30 connecting the front end of the yoke to the inverted channel members 26 is removed so that the rear end portion of the trailer is free to drop downwardly when the undercarriage is shifted forwardly. After the undercarriage has been moved forwardly into the position illustrated in FIGURES 1 and 2 by pressure fluid pumped by a suitable pumping unit (not shown) provided by the tractor, the trailer is further backed up until the tapered rear ends of the longitudinally extending tubular members 11 have been shoved beneath the stack. Thereafter, the cables 41 are unwound from the drums 35 and the free ends of those cables are connected at the rear of the haystack. When the winch is then operated to retract the cables, the haystack will be drawn upwardly and forwardly upon the inclined rack 10 as shown in FIGURE 3. The smooth rounded surfaces of the longitudinal frame members 11, greatly facilitates the loading of the haystack by limiting frictional resistance to movement of the stack.

The longitudinal orientation of the tubular frame members 11, as well as the spacing therebetween tend to guide movement of the stack in longitudinal directions. However, it frequently occurs that the stack tends to shift laterally as it is being loaded upon the trailer and must be repositioned if proper placement of the stack is to be achieved. In the structure of the present invention, lateral displacement of the haystack is obtained by braking one or the other of the independently rotatable shafts 33 and drums 35. Therefore, should it appear that the stack being loaded upon the trailer is advancing towards one side of that trailer, the speed of retraction of the cable portion extending to the drum on the opposite side of the trailer is increased in speed to rotate the stack and to pull it laterally and forwardly, thereby correcting the path of movement of the stack.

After the haystack has been drawn completely upon the rack, hydraulic cylinders 22 are actuated to shift the carriage assembly rearwardly so that the load will be balanced upon the wheels 21. The stack, supported by the horizontally-disposed frame or rack (FIGURE 4) may be pulled to its destination by tractor 32. Then, when unloading of the stack is desired, the undercarriage is again drawn forwardly to tip the frame rearwardly and downwardly until the tapered ends of members 11 touch the ground surface. Cables 41 are disconnected from each other and the free ends thereof are inserted upwardly through the loops or eyes 43 at the outer ends of rear transverse member 15. The ends of the cables are then connected to each other in front of the haystack so that when the winch is again operated to retract the cables the haystack will be shoved rearwardly off of the trailer.

While in the foregoing I have disclosed a specific embodiment of my invention in considerable detail for purposes of illustration, it will be understood by those skilled in the art that many of these details may be varied considerably without departing from the spirit and scope of the invention.

I claim:
1. In a haystack moving apparatus having an elongated rack and a wheeled carriage therebeneath, a pair of aligned transversely extending shafts rotatably mounted adjacent the front end of said rack and extending outwardly in opposite directions from the longitudinal midline thereof, said shafts being provided with cable-receiving drums at the remote outer ends thereof, a differential assembly connecting the inner adjacent ends of said shafts for rotation of the respective shafts at inversely related rotational speed, a driveshaft for operating said differential assembly and for rotating said outwardly extending shafts, and means for selectively reducing the rotational speed of either said outwardly extending shafts and thereby increasing the rotational speed of the other of said shafts while said drive shaft is in rotation.

2. The structure of claim 1 in which said means comprises a pair of brake assemblies operatively engageable with each of said outwardly extending shafts for selectively restraining rotational movement thereof.

3. In a haystack mover, a frame having front and rear ends and having a plurality of longitudinally extending frame members, a wheeled undercarriage beneath said frame, a winch at the front end of said frame, said winch including a pair of transversely spaced rotatable drums, a loop of cable having opposite ends thereof connected to said drums and adapted to be wound thereon for drawing a haystack upon said frame, and means operatively interconnecting said drums for selectively controlling the respective rates of rotation thereof in inverse relation to each other, said means including a differential gear assembly operatively interposed between said drums, and means for independently and selectively restraining rotational movement of said drums.

References Cited in the file of this patent

UNITED STATES PATENTS

| | | |
|---|---|---|
| 595,385 | Gregg | Dec. 14, 1897 |
| 1,884,821 | Osgood | Oct. 25, 1932 |
| 2,305,762 | Cristofoletti et al. | Dec. 22, 1942 |
| 2,479,841 | Jordan | Aug. 23, 1949 |
| 2,708,041 | Young | May 10, 1955 |
| 2,746,583 | Blevius | May 22, 1956 |
| 2,753,064 | Lesser | July 3, 1956 |